United States Patent Office 2,710,243
Patented June 7, 1955

2,710,243

PREPARATION OF THIOSEMICARBAZIDE AND ISOMERS THEREOF

Jerome Swimmer, Chicago, Ill.

No Drawing. Application January 5, 1950,
Serial No. 137,031

6 Claims. (Cl. 23—75)

This invention relates principally to the preparation of hydrazine thiocyanate (I) and its isomer, thiosemicarbazide (II). Hydrazine thiocyanate

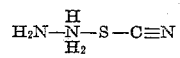

I.

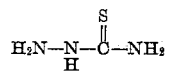

II.

is widely useful, for example, as an analytical reagent, in photographic work, and as an intermediate in the preparation of certain other compounds, particularly certain valuable pharmaceuticals. Thiosemicarbazide is also widely useful, being employed, for example, as an analytical reagent, as a rodenticide, as a photographic developer and as an intermediate in the preparation of certain other compounds, including certain valuable pharmaceuticals.

In the prior art, thiosemicarbazide has been prepared by the interaction of a hydrazine sulfate and sodium or potassium thiocyanate, separating the resulting alkali metal sulfate by filtration and bringing the filtrate to an elevated temperature. To avoid the simultaneous formation of considerable 1,2-di (thiocarbamyl) hydrazine (III) it has been common practice to employ hydrazine hemisulfate (dihydrazine sulfate) rather than the more normal monosulfate.

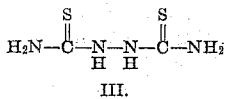

III.

The hemisulfate may be prepared from the monosulfate by treating a slurry or solution containing two hydrogen equivalents of the latter with around one hydrogen equivalent of hydrazine hydrate, hydrazine base, or sodium or potassium hydroxide or carbonate, the final pH being about 5. (Freund et al., Ber., 29, 2501-2, 1896.) The hemisulfate may also be prepared by adding one hydrogen equivalent of an alkaline earth (calcium, strontium, barium) oxide or hydroxide or by adding at least one hydrogen equivalent of an alkaline earth carbonate to a solution or slurry containing two hydrogen equivalents of hydrazine sulfate following which the reaction mixture may be filtered to remove the alkaline earth sulfate formed and any excess alkaline earth carbonate that may have been used. Hydrazine hemisulfate in 1% aqueous solution has a pH of 5 at room temperature in contrast to hydrazine sulfate which is strongly acid.

To facilitate the removal of alkali metal sulfate formed by the interaction of hydrazine hemisulfate and the alkali metal thiocyanate (plus any alkali metal sulfate that may have been formed in preparing the hemisulfate) the reaction volume is kept small. Freund et al. (loc. cit.) also add alcohol at this point to further reduce the solubility of the alkali metal sulfate. The alkali metal sulfate is removed by filtering the, preferably, cooled reaction mixture, is washed with water and the washing is returned to the filtrate. It is obvious that this separation is far from complete due to the high solubility of alkali metal sulfates in water.

The resulting filtrate is then heated under good agitation until a vigorous boil is reached and is maintained at the boil for an appreciable period following which the solution is cooled and the separated thiosemicarbazide is removed by filtration. The product is washed with water to remove adhering mother liquor which is returned to the filtrate. The filtrate is agitated and heated to a vigorous boil, cooled, the separated thiosemicarbazide formed removed by filtration and washed exactly as just described. This whole procedure is repeated a total of six to ten times to recover as much thiosemicarbazide as possible.

It should be emphasized that the above boildown procedure involves much more than the mere removal of water by evaporation. Simultaneously, the hydrazine thiocyanate is isomerized to thiosemicarbazide. A plurality of boildowns with intervening product separation is preferable to a single operation of sufficient duration to complete the isomerization in that the exposure of the rather unstable thiosemicarbazide to high temperatures over long periods of time is thereby avoided.

The crops of crude thiosemicarbazide resulting from the above operations may be combined and purified by recrystallization to obtain a pure, salt free product. Very frequently a plurality of recrystallizations are necessary, for example, two or more recrystallizations, to obtain a salt free product of high purity.

The prior art also suggests boiling down by azeotropic distillation of the reaction mixture in the presence of a water miscible organic liquid such as an alcohol, an alkoxy alcohol, an ether and the like. It is also possible to conduct the boildown procedure by adding the reaction mixture to a boiling, water immiscible liquid such as a hydrocarbon, for example, kerosene. Water of the reaction mixture and a portion of the immiscible liquid pass overhead as vapor which is condensed and the resulting liquid separated, the water immiscible liquid being returned to the boildown apparatus.

Very frequently, the crops of thiosemicarbazide are very dark colored or black and, peculiarly, this color develops during the cooling of the reaction mixture from the boildown temperature to the crystallization temperature. In other words, while a hot solution may be perfectly clear, it may deposit on cooling very dark colored or even black crystals of thiosemicarbazide. I have evolved an explanation for this phenomenon which, it is to be understood, is theory only and I am in no way bound thereby. Thiosemicarbazide, as is well known, exists in two tautomeric modifications, the thioketo form (=C=S), and the mercaptan form (≡C—SH). I believe that at high temperatures the thioketo form is present practically to the exclusion of the mercaptan form. As the temperature is lowered, for example, from the boildown to the crystallization temperature, the equilibrium progressively shifts in the direction of the mercaptan form and this unites with traces of iron compounds present (in accordance with the well known behavior of mercaptans) to give a dark colored contaminating salt. Obviously, this may be avoided by rigorously excluding all traces of iron from the reaction mixture, for example, by use of glass or glass lined equipment. However, not infrequently, the reactants themselves or any water used contain traces of iron compounds and dark or black products are obtained even though glass or glass lined equipment is employed. I have discovered methods for avoiding this discoloration which operate through a mechanism as yet not understood. By application of my discoveries it is possible to produce pure white crystals of thiosemicarbazide even if a trace of iron compounds is present. To accomplish this, a small amount of dilute ammonia (for example, 10% of concentrated ammonia solution in water) is added to the reaction mixture immediately after each boildown and before appreciable cooling has occurred; in the neighborhood of 0.2 volume of the dilute ammonia being added to the reaction mixture immediately after the completion of each boildown. Also, if desired, the dilute ammonia solution may be used to wash the mother liquor from each crop of crystals, this being combined with the filtrate for further processing. It has been found that while dilute ammonia added to the hot reaction mixture will prevent darkening of the crystals formed on cooling, such dark or black crystals when once formed cannot be decolorized by subsequent treatment with dilute ammonia. As will be obvious subsequently, the addition of dilute ammonia to the mother liquors is equally efficacious in the improved process of my invention and should be employed if conditions demand.

I have also found that discoloration of the crops of thiosemicarbazide may be avoided by the addition of a little thiosemicarbazide to the original reaction mixture formed by the interaction of hydrazine hemisulfate and alkali metal thiocyanate. Here it is believed that the traces of iron compounds present react with the mercaptan form of the added thiosemicarbazide and are removed during the filtration operation employed to separate the precipitated alkali metal sulfate. As will be obvious subsequently, the addition of a small amount of thiosemicarbazide to the original reaction mixture is equally efficacious in certain modifications of the improved process of my invention, for example, in those modifications described in detail hereinafter in Examples 2 and 3, and should be employed if conditions demand.

It is evident that the prior art process has many disadvantages. The presence of inorganic salts in the reaction mixture requires an initial filtration thereof to remove these materials as completely as possible, but due to the high solubility of these alkali metal sulfates in water the removal of these materials is far from complete. Furthermore, if a completely salt free product is required, it is necessary to recrystallize the crops of crude thiosemicarbazide, frequently a plurality of times, which obviously requires the expenditure of additional labor, engages equipment and results in a considerable loss of product.

My invention provides an improved process for the manufacture of thiosemicarbazide. By the practice of my invention, thiosemicarbazide may be prepared more economically and more conveniently than has hitherto been possible. Furthermore, my invention provides an economic and convenient method for the preparation of thiosemicarbazide which avoids the complications of prior art processes arising from inorganic salts and results in the direct production of a pure, salt-free product. As an ancillary advantage, my improved process provides an economic and convenient method for the preparation of hydrazine thiocyanate, a compound hitherto obtainable only with great difficulty.

The principal object of my invention is to provide an improved process for the preparation of thiosemicarbazide.

Another object of my invention is to provide an improved process for the preparation of thiosemicarbazide which avoids simultaneous production of water soluble inorganic salts.

A further object of my invention is to provide an improved method for the preparation of hydrazine thiocyanate.

Other objects of my invention will become apparent as the description thereof proceeds.

Briefly and broadly stated, the preferred embodiment of my invention involves the preparation of thiosemicarbazide by the interaction of hydrazine or hydrazine hydrate and a thiocyanate of a volatile base to form hydrazine thiocyanate and said volatile base, volatilizing the base from the reaction mixture and isomerizing the hydrazine thiocyanate to thiosemicarbazide. If desired, the intermediate hydrazine thiocyanate may be produced as the product of my invention. More specifically, illustrative but non limiting examples of my improved process follow.

Example 1

To 31.1 g. hydrazine hydrate (100%) in 25 cc. water are added 45.6 g. solid ammonium thiocyanate. Since the resulting reaction mixture is subsequently subjected to evaporation procedures, it is obviously best to have comparatively little water present. In this example, no useful purpose is served by employing more than, say 100 cc. of water. Since hydrazine hydrate is infinitely soluble in water and as unit weight of cold water will dissolve much more than an equal weight of ammonium thiocyanate there is no need to use, and in fact, it is distinctly disadvantageous to use dilute solutions. It will be noted that in this example a very concentrated hydrazine hydrate solution is used and solid ammonium thiocyanate is employed. If desired, it is not necessary to use any water here, this being especially feasible if hydrazine base is employed instead of the hydrate.

The above reaction mixture began to evolve ammonia immediately and additional quantities were removed on heating to the boiling point. The elimination of ammonia may be greatly accelerated by passing a rapid stream of a suitable gas, for example, nitrogen, through the reaction mixture while the latter is being heated. On reaching the boiling point, heating was continued until the temperature reached 130° C. following which the mixture was cooled to 15° C., 10 cc. water were added and the first crop of thiosemicarbazide was separated by filtration. Mother liquor was removed from the crystals by washing with 30 cc. water which was combined with the filtrate.

A total of five boildowns were run, essentially as described above. The maximum temperatures reached in the second, third, fourth and fifth boildowns were, respectively, 132, 132, 146 and 146° C., while the quantity of fresh water (washings, et cetera) added to the filtrates was similarly 40, 40, 68 and 68 cc. in the boildown procedure, at times an exothermic reaction occurs spontaneously and the temperature of the boiling solution rises rapidly without application of heat. This exothermic reaction can be stopped immediately by adding a little water, for example, 10 cc. in the above example.

In the above example, a 79% yield of good technical grade thiosemicarbazide, melting in the range 177–180° C., was obtained in the five boildowns. This yield could have been increased somewhat by further boildowns.

Since in the above example no alkali metal sulfates (or any other metal salts) are present, the successive crops of thiosemicarbazide are obtained salt free and accordingly the one or more subsequent recrystallizations of the crops necessary in the prior art process to obtain a salt free product are obviously unnecessary. Furthermore, while in the boildown procedure in the presence of alkali metal sulfates, good agitation is necessary to prevent excessive decomposition of the organic components with resulting low yields of thiosemicarbazide, it has been observed that in my improved process such agitation is not necessary for reasons as yet not understood. Obviously, agitation aids in the transfer of heat from the heated surfaces to the solution and is accordingly beneficial under any circumstances, but in my improved process it is not essential for high yields.

It is evident that my improved process represents a considerable advance over the prior art. In accordance with my improved process, it is not necessary to filter the original reaction mixture to remove alkali metal sulfates. This necessary step of the prior art process requires labor and equipment and salt removal is not complete. Also, by my improved process, the product is obtained directly in the pure, salt free form. It is not necessary to recrystallize the combined crops one or more times as in the prior art, a step that again requires labor, engages equipment and results in large losses of product. Finally, as previously mentioned, in my improved process it is not essential that the solutions be agitated while being heated in the boildown procedure for reasons as yet not understood.

While ammonium thiocyanate is employed in the previous example, a thiocyanate of any sufficiently volatile base is suitable for the purpose. Among such salts may be mentioned thiocyanates of primary, secondary and tertiary amines, exemplified by methyl amine thiocyanate, cyclohexylamine thiocyanate, pyridine thiocyanate, morpholine thiocyanate and the like. However, since ammonium thiocyanate is more readily available and less expensive than the above and similar compounds (in fact, is the cheapest source of the thiocyanate ion) it is generally preferred.

*Example 2*

A concentrated aqueous solution containing 10.15 pounds hydrazine hemisulfate (dihydrazine sulfate) and a concentrated aqueous solution containing 9.5 pounds ammonium thiocyanate are mixed. The theoretical amount of lime necessary to react with the sulfate present is added. If desired, an excess of lime may be employed which, after precipitation of calcium sulfate, is in turn precipitated by passing carbon dioxide through the solution, adding ammonium carbonate, or by similar suitable means. The precipitate is separated by filtration and is washed to remove adhering mother liquor, the washings being added to the filtrate. The combined filtrate and washings is worked up as previously described in connection with Example 1.

The procedure of Example 2 is not as advantageous as that of Example 1, but in certain circumstances, depending largely upon the availability and price of hydrazine derivatives, may be more suitable. It will be noted that in Example 2 it is necessary to include a filtration operation to remove calcium sulfate. Also, the resulting thiosemicarbazide may be contaminated by a trace of inorganic salts due to the slight but appreciable solubility of calcium sulfate in water. This may be eliminated by using barium hydroxide or strontium hydroxide in place of lime as the precipitating agent.

Obviously, in Example 2, the lime or its equivalent may be added to the hydrazine hemisulfate prior to the introduction of ammonium thiocyanate and the resulting precipitate may be separated from the reaction mixture either before or after adding the ammonium thiocyanate.

*Example 3*

A concentrated aqueous solution containing 10.15 pounds hydrazine hemisulfate (dihydrazine sulfate) and a concentrated aqueous solution containing 18.10 pounds barium thiocyanate dihydrate are mixed. The resulting precipitate is removed by filtration, preferably after the reaction mixture has been digested at steam bath temperature for an hour or two. Mother liquor is removed from the precipitate by a water wash, the washings being added to the filtrate and the resulting hydrazine thiocyanate solution is isomerized as previously described in connection with Example 1.

The modified process of Example 3 is not as advantageous as the preferred embodiment recited in Example 1 but, in certain circumstances, depending largely upon availability and price of starting materials, may be more suitable. It will be noted that in Example 3, it is necessary to include a filtration operation to remove barium sulfate. Also, if solutions of the reactants are employed, a rather considerable quantity of water is necessary. While hydrazine hemisulfate is very soluble in water, over 40 pounds of water are required to dissolve the mentioned quantity of barium thiocyanate dihydrate. However, it is to be understood that it is not essential to employ solutions of the reactants of my invention, slurries of one or both reactants may be used if desired.

It is obvious that in Example 3, the barium thiocyanate dihydrate may be replaced by an equivalent amount of calcium or strontium thiocyanate. If calcium thiocyanate is employed, the thiosemicarbazide resulting may be contaminated by a trace of inorganic salts due to the slight but appreciable solubility of calcium sulfate in water.

As previously mentioned, thiosemicarbazide is a highly useful compound, both as such and as an intermediate in the preparation of other materials. Thiosemicarbazide is an effective rodenticide and has the advantage, in comparison with compounds of somewhat similar structure, for example, alpha naphthyl thiourea (ANTU), that the response of rodents thereto is not significantly a function of the species, strain or age of the rodent. On the other hand, the ratio $LD_{50}(D)/LD_{50}(R)$ exhibited by thiosemicarbazide is much lower than the same ratio for ANTU which of course is somewhat disadvantageous. (In the above ratio, (D) refers to domestic animals, (R) to rodents). However, since domestic animals are much heavier than rodents, an enormous dose of the thiosemicarbazide would have to be ingested by domestic animals to result in serious consequences.

The use of thiosemicarbazide as an analytical reagent in the identification and/or determination of compounds containing an active carbonyl group, $=C=O$, is well known. Many aldehydes and ketones, for example, react with thiosemicarbazide to produce thiosemicarbazones which are usually obtained as well crystallized compounds of definite and characteristic melting point.

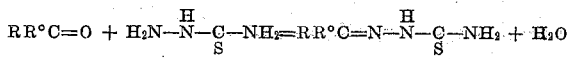

Where
R=alkyl, aryl, or like radical.
R°=alkyl, aryl, or like radical or hydrogen.

As a further, secondary, reaction of analytical importance, the thiosemicarbazones, like thiosemicarbazide itself, exist in the tautomeric thioketo and mercaptan form and as such are capable of reacting with heavy metals as do mercaptans.

It has recently been found that a number of the thiosemicarbazones are promising therapeutic agents in the treatment of tuberculosis. Among these may be mentioned the thiosemicarbazone of p-acetylamino benzaldehyde (Tb I/698 (Schmidt)), of p-methoxy benzaldehyde (Tb II/242 (Schmidt)) and of p-ethylsulfonyl benzaldehyde (Tb III/1374 (Behnisch)).

As mentioned previously, hydrazine thiocyanate is an intermediate in the production of thiosemicarbazide. By my improved process it is a simple matter to isolate this extremely soluble intermediate compound which has not been conveniently possible in the process of the prior art due to the presence of inorganic salts. In my improved process, hydrazine thiocyanate is easily isolated in pure form by the low temperature evaporation of the solution thereof. Thus, in Example 1, the reaction mixture resulting from the interaction of hydrazine hydrate and ammonium thiocyanate is evaporated at low temperature, for example, by gentle heating under reduced pressure, by exposure to infra red light or by passing a stream of warm, dry gas over and/or through the solution.

*Example 4*

The reaction mixture resulting from the addition of ammonium thiocyanate to the stoichiometric quantity of hydrazine hydrate was exposed to infrared radiation. After all water and ammonia had been removed (maximum temperature attained, 86° C.), the solid was treated with five times its weight of methanol. Following this, two volumes isopropanol (based on the methanol) were added and the resulting mixture cooled and filtered to remove the small amount of thiosemicarbazide that had formed, presumably during exposure to the infra red lamp. On concentrating the filtrate to remove methanol, hydrazine thiocyanate is obtained, melting at 79° C.

Hydrazine thiocyanate is itself an extremely useful compound. It will, for example, react with active carbonyl groups to form hydrazones. Many of these hydrazones are useful in identifying and/or determining various aldehydes and ketones while others, such as the hydrazones of p-acetylamino benzaldehyde, p-methoxy benzaldehyde, p-ethylsulfonyl benzaldehyde and the like appear to be potentially valuable therapeutic agents both as such and after salt formation with thiocyanic acid.

Be it remembered, that while my invention has been described in connection with certain specific examples and details thereof, these are illustrative only and in no way limit the scope thereof except as these may be included in the accompanying claims.

I claim:

1. A process for the production of hydrazine thiocyanate comprising admixing a compound selected from the group consisting of hydrazine and hydrazine hydrate with an approximately equimolecular quantity of the thiocyanate of a volatile base, and removing the base produced and any water present at a temperature below the boiling point of the reaction mixture.

2. A process for the production of hydrazine thiocyanate comprising admixing a compound selected from the group consisting of hydrazine and hydrazine hydrate with an approximately equimolecular quantity of ammonium thiocyanate, and removing the ammonia produced and any water present at a temperature below the boiling point of the reaction mixture.

3. A process for the formation of thiosemicarbazide which comprises heating to approximately its boiling point an aqueous solution, of a mixture of hydrazine and ammonium thiocyanate in approximately equimolecular proportions, and recovering the thiosemicarbazide thus formed from the reaction mixture.

4. A process for the production of thiosemicarbazide comprising admixing a compound selected from the group consisting of hydrazine and hydrazine hydrate with an approximately equimolecular quantity of the thiocyanate of a volatile base and removing the base produced and any water present by heating to approximately the boiling point of the reaction mixture and recovering the thiosemicarbazide thus formed from the reaction mixture.

5. A process for the production of thiosemicarbazide comprising admixing a compound selected from the group consisting of hydrazine and hydrazine hydrate with an approximately equimolecular quantity of ammonium thiocyanate and removing the base produced and any water present by heating to approximately the boiling point of the reaction mixture and recovering the thiosemicarbazide thus formed from the reaction mixture.

6. A process for the production of thiosemicarbazide comprising heating to approximately its boiling point an aqueous solution, of a mixture of hydrazine and the thiocyanate of a volatile base in approximately equimolecular proportions, and recovering the thiosemicarbazide thus formed from the reaction mixture.

References Cited in the file of this patent

UNITED STATES PATENTS

| 422,334 | Curtius | Feb. 25, 1890 |
| 914,214 | Acker | Mar. 2, 1909 |
| 2,450,406 | Bambas | Oct. 5, 1948 |

OTHER REFERENCES

Curtius: "J. Prak. Chem.," vol. 52, series 2 (1895), pp. 488–89.

Wieland: "Die Hydrazine" (1913), p. 221.

Audrieth: "The Chemistry of Hydrazine" (1951), pp. 224–32.

Audrieth: "The Chemistry of Hydrazine" (1951), published by John Wiley and Sons, Inc. N. Y. C., pp. 171 and 178.

Richters: Organic Chemistry, vol. 1 (1944), Elsevier ed., p. 511.